United States Patent
Takatsuka et al.

(10) Patent No.: US 8,055,647 B2
(45) Date of Patent: Nov. 8, 2011

(54) SYSTEM, METHOD AND PROGRAM FOR DATABASE SEARCHING

(75) Inventors: Kazuyoshi Takatsuka, Tononaka (JP); Masaomi Kimura, Tokyo-to (JP); Akihiko Imai, Nara (JP)

(73) Assignee: International Business Machines Corporation, Armonk, NY (US)

( * ) Notice: Subject to any disclaimer, the term of this patent is extended or adjusted under 35 U.S.C. 154(b) by 1517 days.

(21) Appl. No.: 10/959,513

(22) Filed: Oct. 6, 2004

(65) Prior Publication Data

US 2005/0076024 A1 Apr. 7, 2005

(30) Foreign Application Priority Data

Oct. 6, 2003 (JP) .................... 2003-346780

(51) Int. Cl.
*G06F 17/30* (2006.01)
(52) U.S. Cl. ...................................... 707/713
(58) Field of Classification Search .............. 707/3
See application file for complete search history.

(56) References Cited

U.S. PATENT DOCUMENTS

| | | | | | |
|---|---|---|---|---|---|
| 5,673,404 A | * | 9/1997 | Cousins et al. | ............... | 715/809 |
| 5,758,355 A | * | 5/1998 | Buchanan | ............... | 707/201 |
| 5,864,842 A | * | 1/1999 | Pederson et al. | ............... | 707/3 |
| 5,873,079 A | * | 2/1999 | Davis et al. | ............... | 707/3 |
| 5,894,311 A | * | 4/1999 | Jackson | ............... | 345/440 |
| 5,963,940 A | * | 10/1999 | Liddy et al. | ............... | 707/5 |
| 6,026,391 A | * | 2/2000 | Osborn et al. | ............... | 707/2 |
| 6,401,099 B1 | * | 6/2002 | Koppolu et al. | ........... | 707/103 R |
| 6,463,426 B1 | * | 10/2002 | Lipson et al. | ............... | 707/3 |
| 2003/0126117 A1 | * | 7/2003 | Megiddo et al. | ............... | 707/3 |
| 2004/0078251 A1 | * | 4/2004 | DeMarcken | ............... | 705/5 |

FOREIGN PATENT DOCUMENTS

| | | |
|---|---|---|
| JP | PUPA 03-208143 | 9/1991 |
| JP | PUPA 04-281538 | 10/1992 |
| JP | PUPA 06-231173 | 8/1994 |
| JP | PUPA 06-309284 | 11/1994 |
| JP | PUPA 08-314965 | 11/1996 |
| JP | PUPA 11-203301 | 7/1999 |

OTHER PUBLICATIONS

Haas et al. "DiscoveryLink: a system for Integrated Acess to Life sciences Data Sources", IBM System Journal, vol. 40, No. 2, 2001.*
Snow et al. "Taking Control: DB2 Query Patroller" DB2 magazine, quarter 2, 2003.*

(Continued)

*Primary Examiner* — Sathyanarayan Pannala
*Assistant Examiner* — Yuk Ting Choi
(74) *Attorney, Agent, or Firm* — Yee & Associates, P.C.; Arthur J. Samodovitz

(57) ABSTRACT

System, method and computer program product for searching through multiple databases based on a search expression. Distribution of records corresponding to search keys in the database is defined. The search expression is divided into multiple search expressions based in part on the defined distribution of records. Respective, target search ranges are determined for the multiple search expressions such that a number of records to be searched with each of the multiple search expressions is approximately constant. The multiple search expressions are executed in their respective, target search ranges. The search ranges can also be determined for the multiple search expressions based in part on search rates through respective search ranges.

16 Claims, 14 Drawing Sheets

OTHER PUBLICATIONS

L. M. Haas et al. "DiscoveryLink: A System for Integrated Access to Life Sciences Data Sources", IBM Systems Journal, vol. 40, No. 2, 2001 (23 pages).

A.D. Jhingran et al. "Information Integration: A Research Agenda", IBM Systems Journal, vol. 41, No. 4, 2002 (6 pages).

M. A. Roth et al. "Information Integration: A New Generation of Information Technology", IBM Systems Journal, vol. 41, No. 4, 2002 (10 pages).

L. M. Haas et al. "Data Integration Through Database Federation", IBM Systems Journal, vol. 41, No. 4, 2002 (16 pages).

D. Chamberlin, "XQuery: An XML Query Language", IBM Systems Journal, vol. 41, No. 4, 2002 (20 pages).

Malaika et al. "DB2 and Web Services", IBM Systems Journal, vol. 41, No. 4, 2002 (14 pages).

"Infrastructures of Strategic Data Analysis—Data Warehouse and Data Mining", IPSJ Magazine, vol. 40., No. 12, pp. 1236-1239 (Abstract Only).

Summary of JP Examiner cited art.

Summary of JP Examiner cited art., (May 29, 2007).

* cited by examiner

[Figure 1]
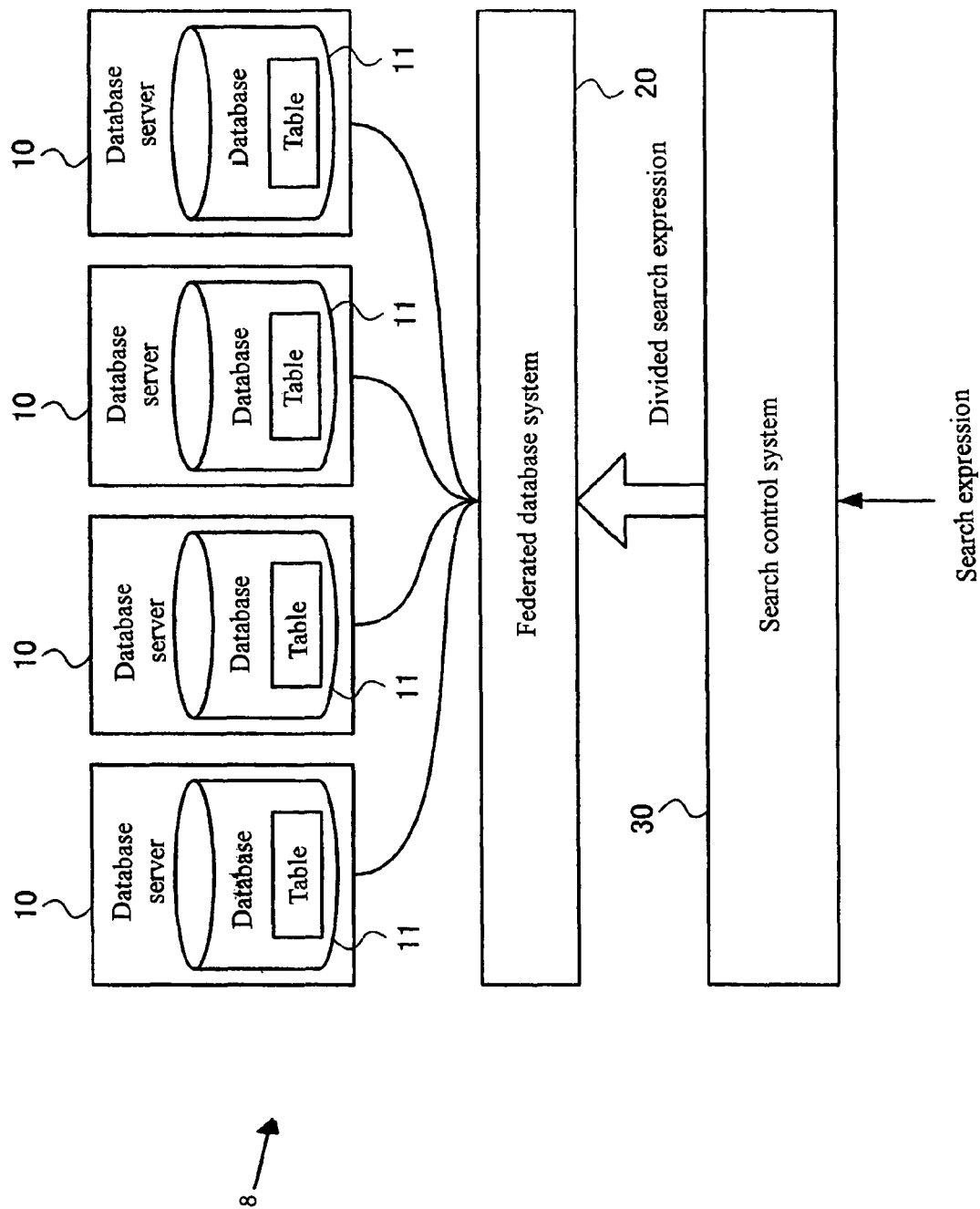

[Figure 2]
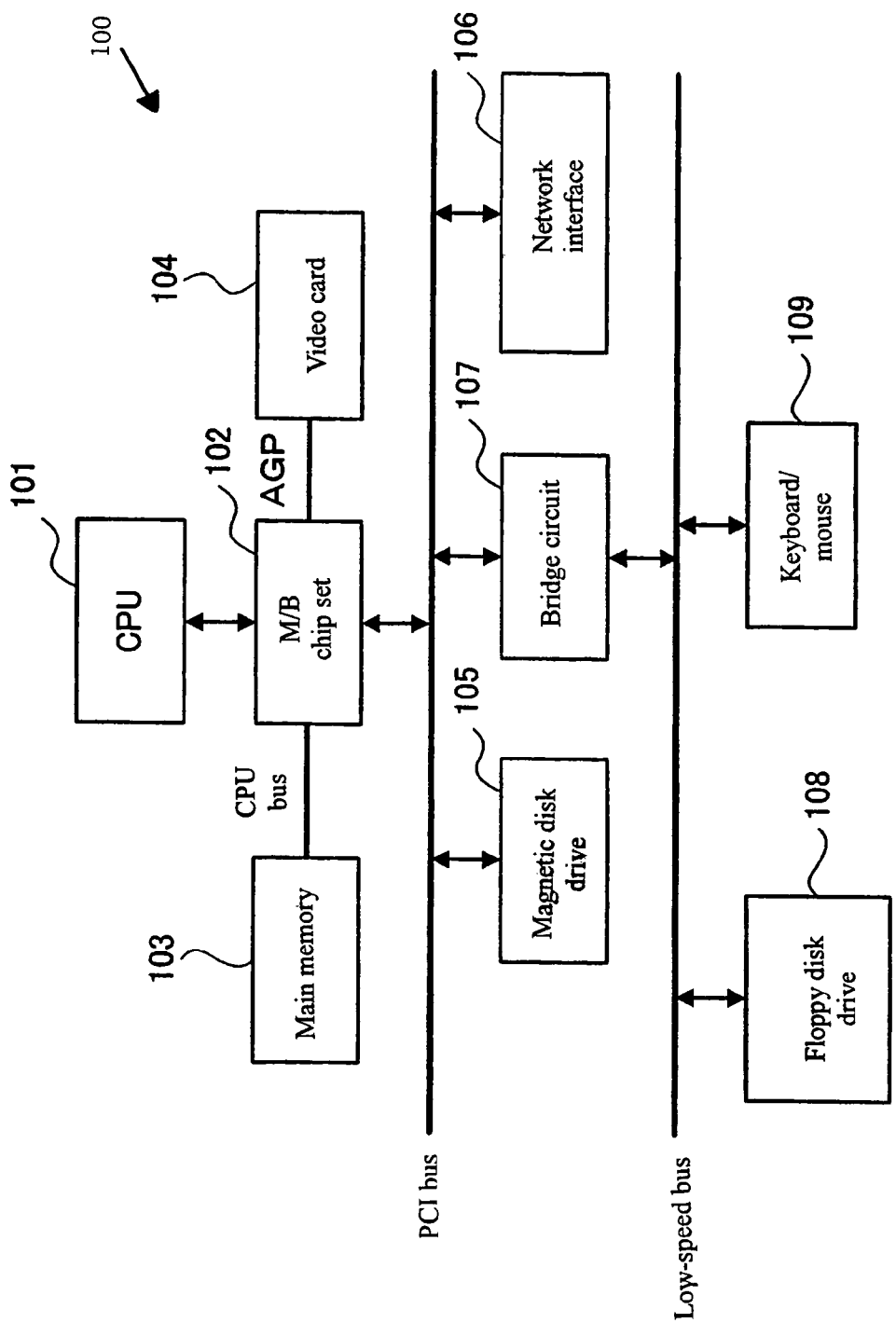

[Figure 3]
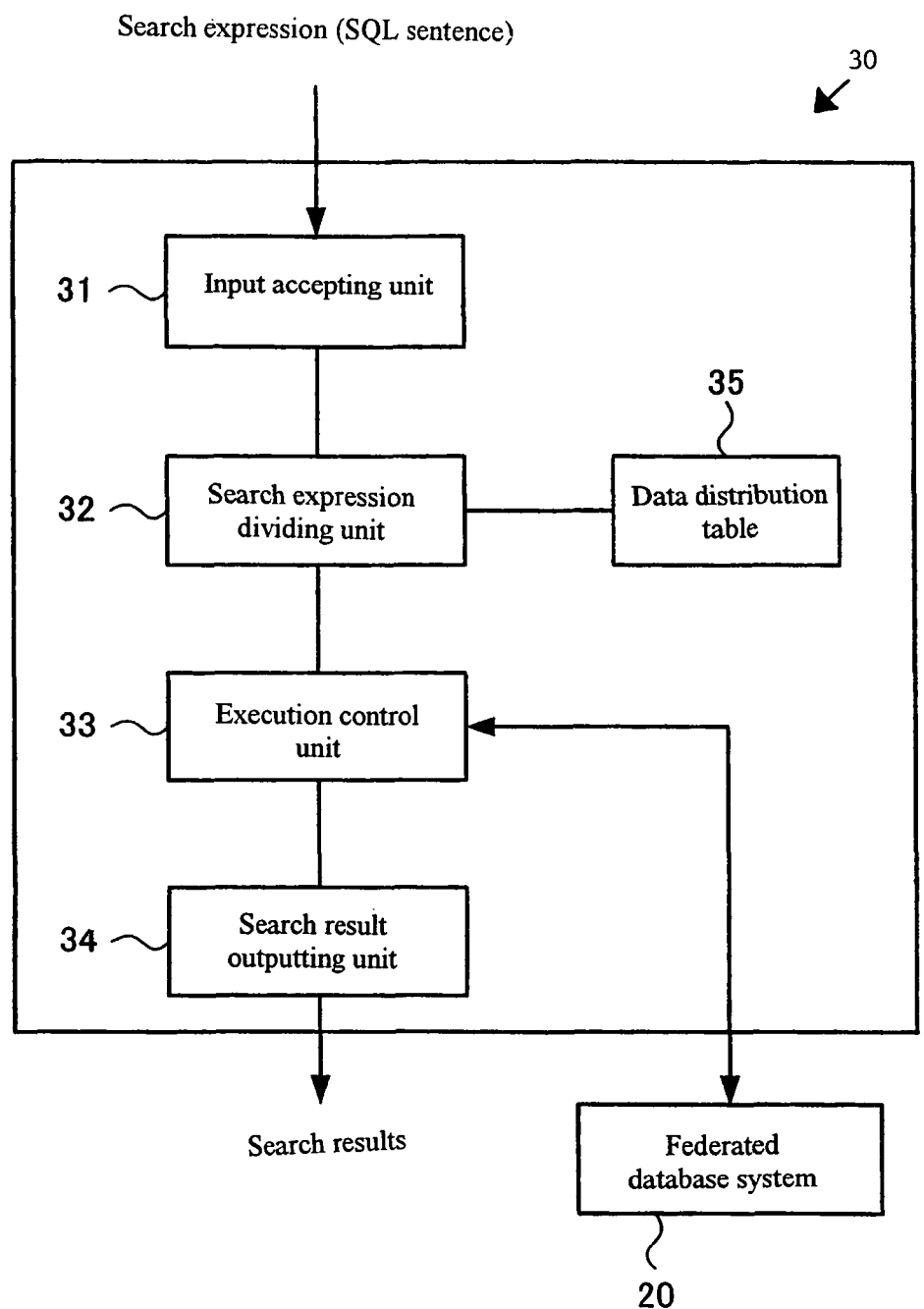

[Figure 4]

| Table name | Range 1 | Range 2 | Range 3 | Range 4 | Range 5 | ... | Range N | Throughput correction value |
|---|---|---|---|---|---|---|---|---|
| Base table | 1000 | 1000 | 980 | 1000 | 1000 | ... | 1000 | 1 |
| Link table 1 | 6 | 88 | 500 | 5 | 444 | ... | 500 | 5 |
| Link table 2 | 300 | 500 | 400 | 200 | 10 | ... | 200 | 2 |
| Link table 3 | ... | ... | ... | ... | ... | ... | ... | 3 |
| Link table 4 | Number | Number | Number | Number | Number | ... | Number | Throughput rate relative to base table |

35

[Figure 5]
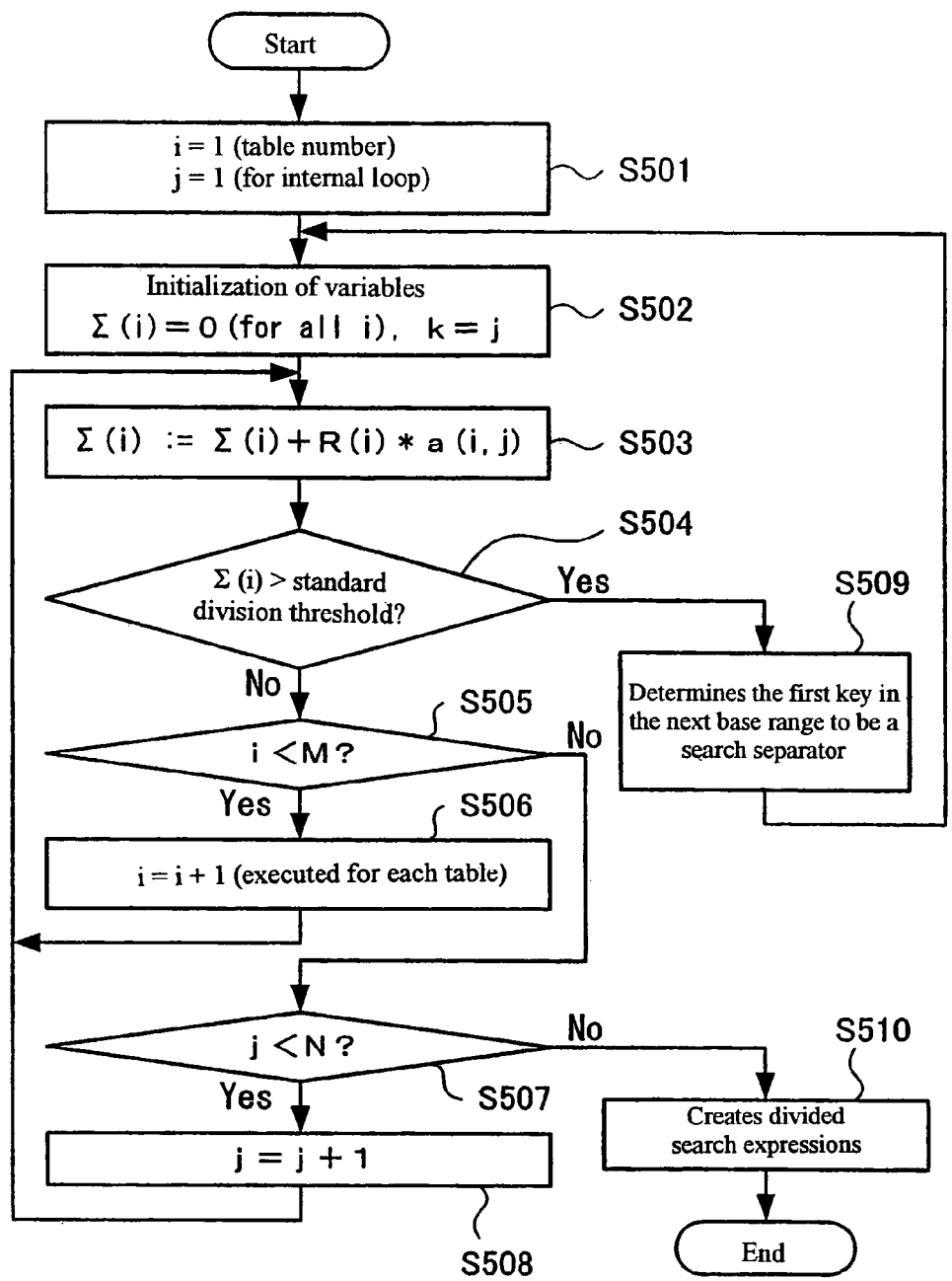

[Figure 6]
SELECT KEY FROM TABLE1, TABLE2
WHERE
TABLE1.KEY=TABLE2KEY
OTHER CONDITION(TABLE2)
KEY BETWEEN range 1 and range 4
KEY BETWEEN range 5 -
KEY BETWEEN - range N
SELECT KEY
FROM TABLE1, TABLE2
WHERE
TABLE1.KEY=TABLE2KEY
OTHER CONDITION(TABLE2)

[Figure 7]

At search start

| Number of retrieved data | To be searched | |
|---|---|---|
| | Number of finished data | Total number |
| 0 | 0 | 10000 |

Intermediate progress 1

| Number of retrieved data | To be searched | |
|---|---|---|
| | Number of finished data | Total number |
| 10 | 1000 | 10000 |

Intermediate progress 2

| Number of retrieved data | To be searched | |
|---|---|---|
| | Number of finished data | Total number |
| 34 | 5000 | 10000 |

At search end

| Number of retrieved data | To be searched | |
|---|---|---|
| | Number of finished data | Total number |
| 76 | 10000 | 10000 |

[Figure 8]
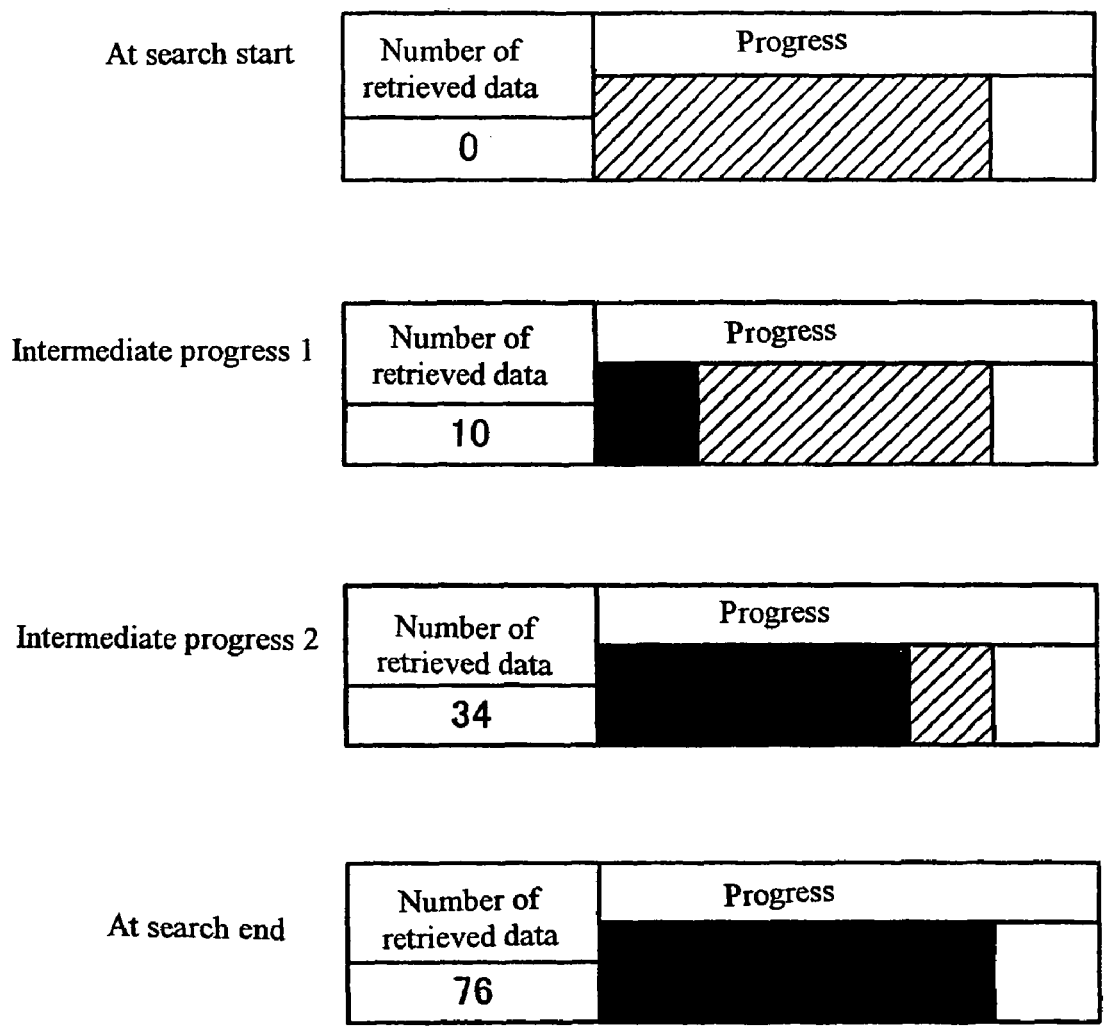

FIG. 9 (A)

| Key data | Classification code | Numerical value |
|---|---|---|
| 1001 | A | 3 |
| 1001 | B | 3 |
| 1001 | C | 4 |
| 1002 | A | 5 |
| 1002 | B | 2 |
| 1002 | C | 4 |
| 1003 | A | 2 |
| 1003 | B | 2 |
| 1003 | C | 4 |
| 1003 | D | 5 |
| 1004 | A | 5 |
| 1004 | B | 3 |
| 1004 | C | 3 |

FIG. 9 (B)

Cross table

| Key data | A | B | C | D |
|---|---|---|---|---|
| 1001 | 3 | 3 | 4 | — |
| 1002 | 5 | 2 | 4 | — |
| 1003 | 2 | 2 | 4 | 5 |
| 1004 | 5 | 3 | 3 | — |

FIG. 9 (C)

Hierarchical table

| Key data | Classification code | Numerical value |
|---|---|---|
| 1001 | A | 3 |
|  | B | 3 |
|  | C | 4 |
| 1002 | A | 5 |
|  | B | 2 |
|  | C | 4 |
| 1003 | A | 2 |
|  | B | 2 |
|  | C | 4 |
|  | D | 5 |
| 1004 | A | 5 |
|  | B | 3 |
|  | C | 3 |

[Figure 10]

| Item name | Range 1 | Range 2 | Range 3 | Range 4 | Range 5 | ... | Range N |
|---|---|---|---|---|---|---|---|
| Item 1 | 40 | 300 | 30 | 200 | 0 | ... | 200 |
| Item 2 | 0 | 30 | 0 | 20 | 50 | ... | 0 |
| Item 3 | 0 | 0 | 0 | 200 | 0 | ... | 200 |
| Item 4 | ... | 0 | ... | 0 | ... | ... | ... |
| Item 5 | Number | Number | Number | Number | Number | ... | Number |

35a

[Figure 11]
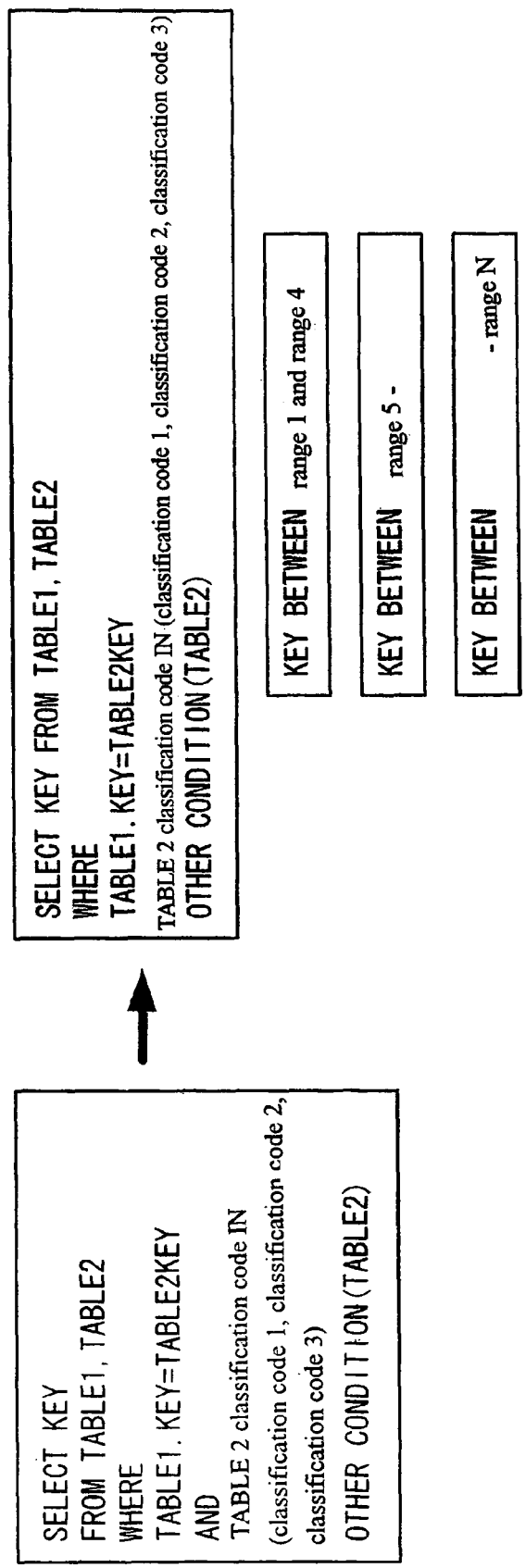

[Figure 12]

| Table name | Range 1 | Range 2 | Range 3 | Range 4 | Range 5 | ... | Range N | Throughput correction value | Security field |
|---|---|---|---|---|---|---|---|---|---|
| Base table | 1000 | 1000 | 980 | 1000 | 1000 | ... | 1000 | 1 | 1 |
| Link table 1 | 6 | 88 | 500 | 5 | 444 | ... | 500 | 5 | 1 |
| Link table 2 | 300 | 500 | 400 | 200 | 10 | ... | 200 | 2 | 2 |
| Link table 3 | ... | ... | ... | ... | ... | ... | ... | 3 | 1 |
| Link table 4 | Number | Number | Number | Number | Number | ... | Number | Throughput rate relative to base table | 1 |

35

| Item name | Range 1 | Range 2 | Range 3 | Range 4 | Range 5 | ... | Range N | Security field |
|---|---|---|---|---|---|---|---|---|
| Item 1 | 40 | 300 | 30 | 200 | 0 | ... | 200 | 1 |
| Item 2 | 0 | 30 | 0 | 20 | 50 | ... | 0 | 2 |
| Item 3 | 0 | 0 | 0 | 200 | 0 | ... | 200 | 1 |
| Item 4 | ... | 0 | ... | 0 | ... | ... | ... | 2 |
| Item 5 | Number | Number | Number | Number | Number | ... | Number | 1 |

35a

[Figure 13]
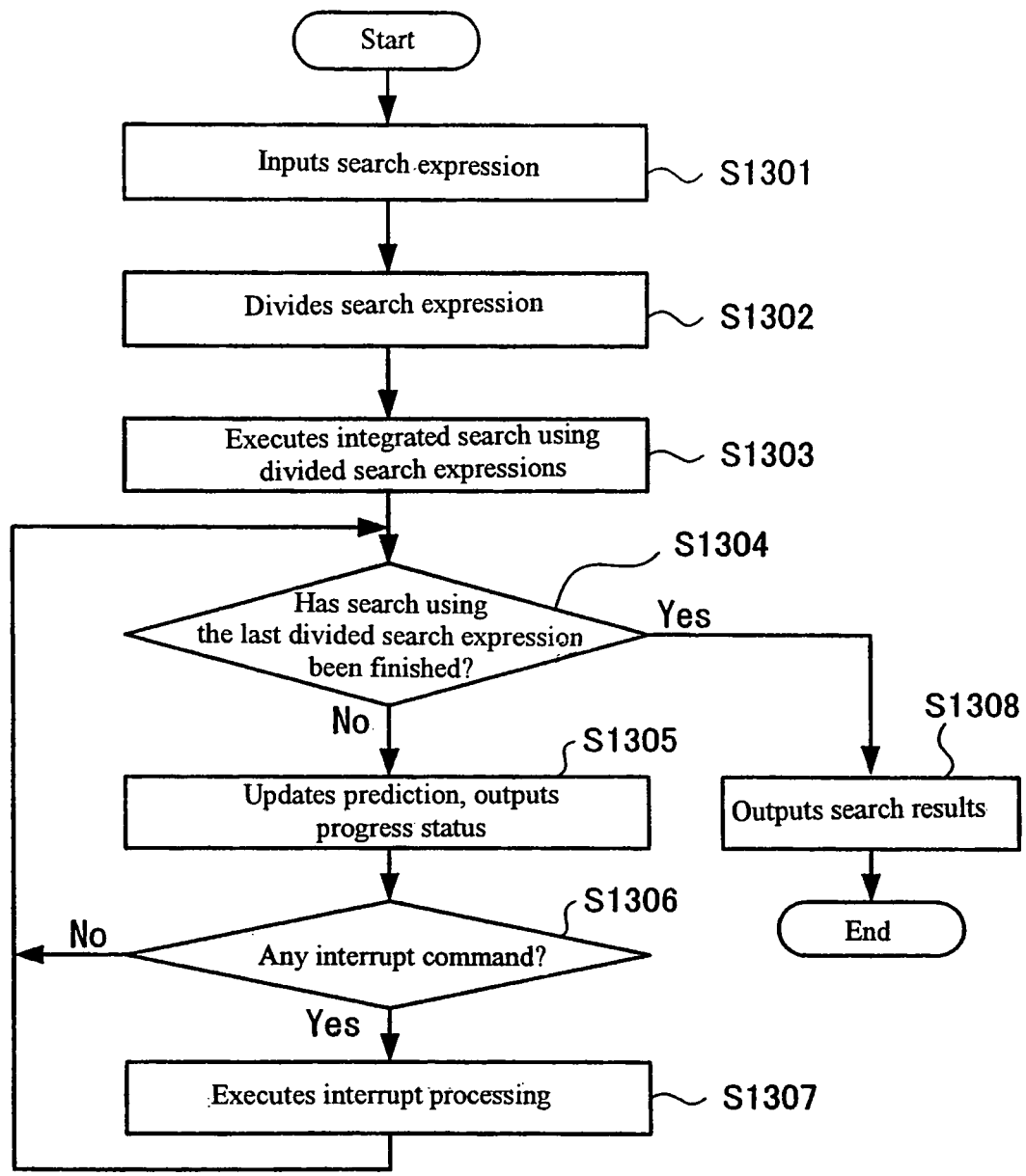

[Figure 14]
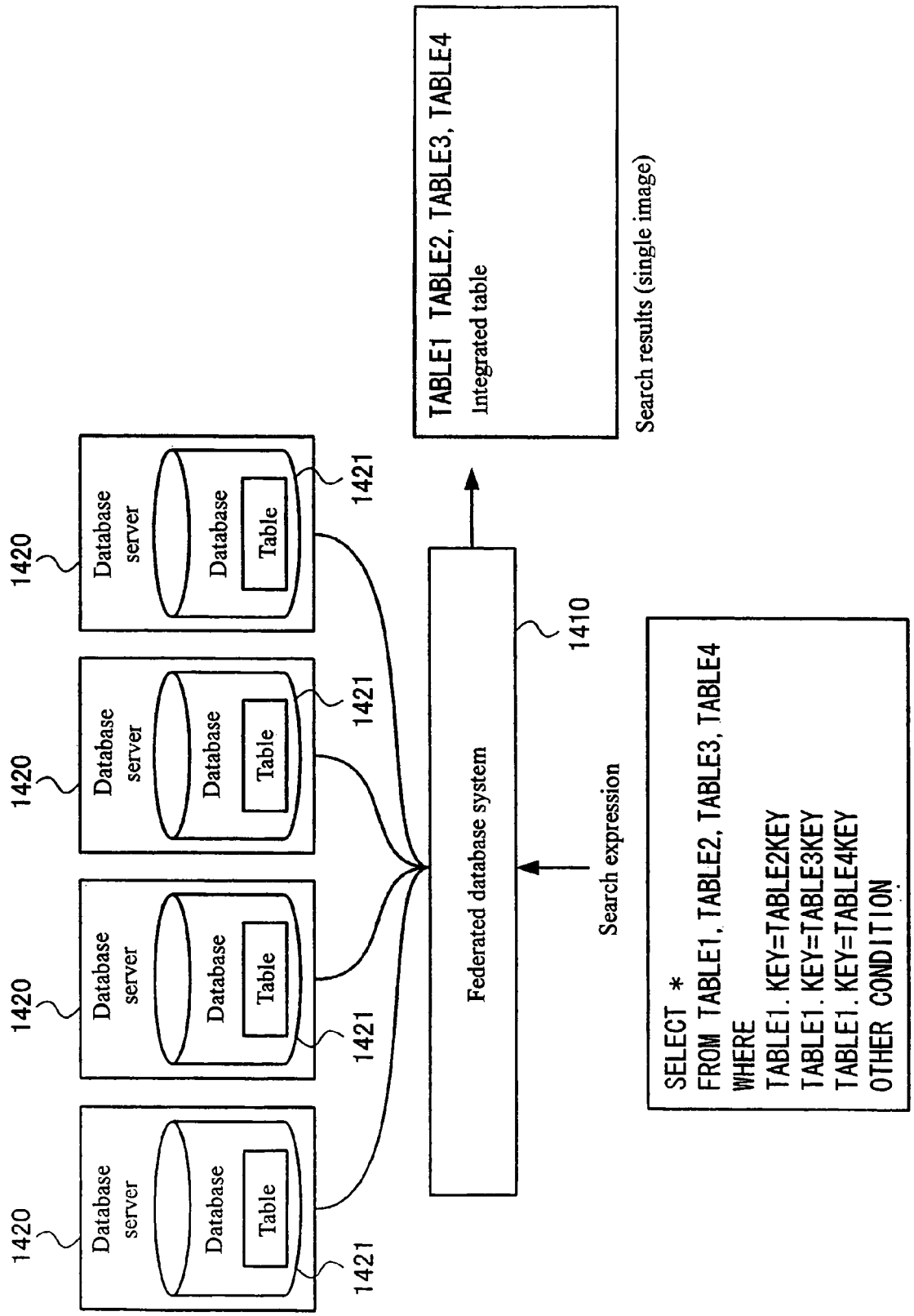

SYSTEM, METHOD AND PROGRAM FOR DATABASE SEARCHING

BACKGROUND OF THE INVENTION

The present invention relates generally to computer data base searching, and more particularly to searching through a distributed database.

It was known to aggregate data in advance to facilitate searches. Data aggregation can be performed as a batch process. However, this causes a time delay before new data can be searched. Furthermore, reconstruction of a database may be required when adding a new data item.

It was also known to create a distributed or federated database for managing scattered data. For example, see L. M. Haas et al., "DiscoveryLink: A system for integrated access to life sciences data sources", IBM Systems Journal Vol. 40, No. 2, 2001; and "DB2 Information Integrator V8" (technical paper) (IBM Systems Journal Vol. 41)", 2002, IBM Japan, retrieved on Aug. 27, 2003 via the Internet <URL: http://www-6.ibm.com/jp/software/data/developer/library/techdoc/d b2func.html#ii>. This is a technique for providing an integrated database image from a distributed database by directly accessing the distributed database. The distributed databases are not aggregated, which avoids a delay in searching for new data. Furthermore, due to the direct access of the individual databases, it is easier to add new data.

FIG. 14 illustrates a prior art integrated search by a distributed database system 1410. Distributed database system 1410 performs an integrated search using a single search expression (SQL: Structured Query Language) for each of the tables of databases 1421 in multiple servers 1420 to obtain a single image as the search result. Thus, the distributed database in the multiple servers 1420 can be searched as a single database.

As described above, by using a distributed database system, it is possible to directly access individual databases to perform data searches, without aggregating the data. In a distributed database system, however, a search similar to an ordinary database search may be performed using a search expression in SQL. With this type of search, a response is not received until the search has been finished and the search results are obtained. The time required for the search cannot be accurately predicted before the search ends. Furthermore, in the distributed database system, a search is performed with a single SQL search expression. Due to the characteristics of SQL systems, the search process cannot be interrupted once started until all the target databases have been searched. Therefore, flexible operations cannot be performed during the search, such as checking the progress status, canceling the search, and changing the search condition to resume the search.

Accordingly, an object of the present invention is to enable flexible operations during execution of a search, such as checking the progress status, predicting the time required for the search and permitting an interrupt by other processes, in a distributed database system.

SUMMARY OF THE INVENTION

The present invention resides in a system, method and computer program product for searching through multiple databases based on a search expression. Distribution of records corresponding to search keys in the database is defined. The search expression is divided into multiple search expressions based in part on the defined distribution of records. Target search ranges are determined for the multiple search expressions such that a number of records to be searched with each of the multiple search expressions is approximately constant. The multiple search expressions are executed in their respective, target search ranges.

The present invention also resides in a system, method and computer program product for searching through multiple databases based on a search expression. The search expression is divided into multiple search expressions. Respective search ranges are determined for the multiple search expressions based in part on search rates through respective search ranges. The multiple search expressions are executed.

According to a feature of the present invention, the search ranges are determined such that each of the multiple search expressions is executed in a time less than or equal to a predetermined duration.

The present invention can be implemented as a database search system comprising: a search execution unit for executing a search of one or more databases by using a search expression; a data distribution table showing how records corresponding to search keys in each of the tables for the one or more databases to be searched are distributed; a search expression dividing unit for dividing, based on the distribution of records shown in the data distribution table, a search expression into multiple search expressions with search ranges such that the number of records to be searched with each of the divided search expressions is approximately constant; and an execution control unit for sending the divided search expressions to cause the search expression dividing unit to execute searches.

The search expression dividing unit can adjust, for each of the tables of the databases, the number of records included in the search range based on the response rate of the database corresponding to the table.

By dividing the original search expression into multiple search expressions for respective search ranges, during the process of sequentially executing the divided search expressions, the progress of the search process can be determined based on how many search expressions have already been completed finished and the amount of searching yet to be completed.

Also, interrupts can be processed between search expressions. When the search is suspended by an interrupt processing, a user can change the search conditions for searches with the remaining divided search expressions or cause the searches with the remaining search expressions to be automatically executed as a batch process.

The data stored in the databases can be classified according to predetermined classification codes. The data distribution table can be converted into distribution of records according to keys classified according to the classification codes. The search expression can be divided using it. This makes it possible to obtain and arrange search results based on the classification codes.

BRIEF DESCRIPTION OF THE FIGURES

FIG. 1 is a block diagram illustrating a search system according to the present embodiment.

FIG. 2 is a block diagram of hardware components of a computer that implements a search control system of the present invention.

FIG. 3 is a flow chart illustrating programming within the search control system of the present invention.

FIG. 4 illustrates a data distribution table of the search control system of FIG. 3.

FIG. 5 is a flowchart illustrating programming performed by a search expression dividing unit of the present invention.

FIG. 6 shows an example of an input SQL search expression and division of the search expression into multiple search expressions according to the present invention.

FIG. 7 shows an example of notification of progress status of search processing of the present invention.

FIG. 8 shows another example of notification of progress status of search processing of the present invention.

FIGS. 9(A), 9(B) and 9(C) show an example of a search results data table, cross table and hierarchical table compiled from search results of the present invention.

FIG. 10 shows a data distribution table for classification codes according to the present invention.

FIG. 11 shows an example of a SQL search expression used for searching tables having classification codes and divided search expressions according to the present invention.

FIG. 12 shows security fields which have been added to a data distribution table according to the present invention.

FIG. 13 is a flowchart illustrating a data search program performed by the integrated search system of the present invention.

FIG. 14 illustrates a search in a distributed database system, according to the PRIOR ART.

DETAILED DESCRIPTION OF THE PREFERRED EMBODIMENTS

The present invention will now be described in detail with reference to the figures. FIG. 1 illustrates an integrated search system generally designated 8 according to the present invention. Integrated search system 8 comprises multiple database servers 10, a distributed or federated database search system 20 and a search control system 30. Search control system 30 furnishes a search expression (such as SQL) to the distributed database system 20 to control a database search. Distributed database system 20 performs an integrated search in database servers 10. In this embodiment of the present invention, the integrated search combines various route expressions using variables with an equivalent attribute. The route expressions comprise table data that exist in various servers. A key with a common attribute is required for the integrated search. Attributes other than a common key are set as the object of integrated search. A common key with the equal attribute of each table is used for the integrated search.

In integrated search system 8, the database servers 10 are ordinary servers and databases 11 reside in storage devices such as a magnetic disk. The distributed database system 20 is a search execution unit for integrating the multiple database servers 10 to form a distributed database. Distributed database system 20 can be formed by adding the functions of the search control system 30 to an existing distributed database system. The integrated search system 8 of the present invention is not limited to the specific hardware configuration illustrated in FIG. 1. For example, the distributed database system 20 and the search control system 30 may be the same or different computers.

FIG. 2 illustrates an example of hardware components of a computer 100 for implementing the search control system 30 of the present invention. Computer 100 comprises a CPU (central processing unit) 101, and a main memory 103 connected to the CPU 101 via a M/B (mother board) chip set 102 and a CPU bus. Computer 100 also comprises a video card 104 connected to the CPU 101 via the M/B chip set 102 and an AGP (accelerated graphics port). Computer 100 also comprises a magnetic disk drive (HDD) 105 connected to the M/B chip set 102 via a PCI (peripheral component interconnect) bus, a network interface 106, a floppy (TM) disk drive 108 and a keyboard/mouse 109 connected to the M/B chip set 102 via the PCI bus, a bridge circuit 107 and a low speed bus such as an ISA (industry standard architecture) bus. It is also possible to provide drives such as a CD-R (compact disc recordable) and a DVD-RAM (digital versatile disc random access memory) via interfaces such as an ATA (AT attachment) and a SCSI (small computer system interface), as external storage devices.

FIG. 3 illustrates computer program function of the search control system 30. The search control system 30 comprises (a) an input accepting unit 31 for accepting a search expression for a database search, (b) a search expression dividing unit 32 for dividing the original, received search expression into multiple search expressions, (c) an execution control unit 33 for controlling execution of search processes using the multiple search expressions, and (d) a search result outputting unit 34 for collectively outputting search results. Search control system 30 also comprises a data distribution table (or data mapping table) 35 used by the search expression dividing unit 32 for dividing a search expression. In the illustrated embodiment, the input accepting unit 31, the search expression dividing unit 32, the execution control unit 33 and the search result outputting unit 34 are provided by a program executing in CPU 101 of the computer shown in FIG. 2. The data distribution table 35 is stored in the main memory 103 or the magnetic disk drive 105 shown in FIG. 2.

The input accepting unit 31 receives a search expression (SQL expression) for a database search via keyboard/mouse 109, the storage means such as the magnetic disk drive 105, the network interface 106 or the like shown in FIG. 2. The search expression is similar to that input into an ordinary distributed database system 20, which can be a single search expression describing one or more search conditions or "keys". The search expression dividing unit 32 adds a condition or range to the key(s) of the single search expression supplied to the input accepting unit 31 and divides it into multiple search expressions, each with a different range. The search expressions are divided based on different ranges of key. The multiple search expressions are defined to yield searches which can be performed with a limited response time. The search expression dividing unit 32 uses the data distribution table 35 in dividing the search expression.

According to the present invention, the distributed database system 20 performs an integrated search of the multiple databases 11 with the same key. Database system 20 logically combines the tables of the databases 11 by creating a virtual table using an item with an equivalent attribute among the tables as an argument. In other words, it is necessary for the tables to be referenced by the distributed database system 20 have a common key. The data distribution table 35 illustrated in FIG. 4 indicates how the records corresponding to the common key are distributed in each table. The data distribution table 35 is created as follows.

First, one of the tables is designated as "a base table" to be the core of an integrated search. The base table is divided into ranges for a key such that the number of records in each ranges is approximately constant. The resultant ranges are referred to as base ranges. The names of the base ranges are "range 1", "range 2" . . . "range N" in ascending order of the key values. Then, for each of the other tables (referred to as link tables) to be combined with the base table, the number of records corresponding to the base table key is calculated and recorded in association with the respective base range. Each link table is prepared ahead of time and is divided into ranges which correspond to the ranges of the base table. The range of each table is based on the expected amount of response time to avoid exceeding a limit. Then, the response rate of each table (that is, the throughput in each of the database servers 10) is measured and recorded as a correction value for the table. The time required for searching all the items for a key is used as the response time. In this way, data distribution table 35 is formed in which distribution of key data in each table is recorded.

FIG. 4 illustrates an example of the data distribution table 35. In the data distribution table 35, records in tables are distributed for each of the base ranges (range 1, range 2, . . . range N) set with a base table as the basis. For example, for data records satisfying the search key/condition included in range 1, there are one thousand such records in the base table, six in the link table 1 and three hundred in the link table 2. Every record in the base table satisfies the search condition/key. The link tables specify the number of records that satisfy the search key/condition and correspond to the ranges of the base table. This data distribution table 35 can be used for an integrated search in which a table defined as a base table and the other tables are combined first. If there are any other tables to be a base table, the same operation is performed for each such table to create a data distribution table 35 with the table as a base table.

FIG. 5 is a flowchart showing how the search expression dividing unit 32, using a data distribution table 35, divides an input search expression into multiple search expressions according to the present invention. Initially, the search expression dividing unit 32 multiplies the data (the number of records) for each table in the data distribution table 35 by a throughput correction value (indicated as a correction value in the figure) to create a corrected data distribution table. The correction value for the base table is "one" to serve as a base rate or reference. In the data distribution table 35 in FIG. 4, the correction value for the link table 1 for the range one is "five". The correction value, along with the size of each table, determines the time required for searching the table. Thus, the time required to search for six records of the link table 1 for range one when the correction value is "five" is equivalent to the time required for searching thirty records when the correction value is "one". The search expression dividing unit 32 also determines a standard division threshold for determining search division ranges (that is, ranges to be searched by individual search expressions). The standard division threshold may be determined with the entire throughput of the integrated search system as the basis.

The search expression dividing unit 32 then examines the first key for the table 1 (i=1, i:1≦i≦M; the table 1 corresponds to the base table in FIG. 4) for the range 1 (j=1, j:1≦j≦N) among the base ranges, and determines this key as a key for separating the search range (hereinafter referred as a search separator) (step 501). Then, the search expression dividing unit 32 sets a variable Σ(i) indicating the search range to be searched and initializes a variable k indicating the starting point of the search range (step 502). That is, Σ(i)=0 and k=j. The search expression dividing unit 32 then substitutes Σ(i)+R(i)*a(i,j) to Σ(i) (step 503), where R(i) is the throughput correction value of the table i and a(i,j) is the number of records in the range j of the table i. Accordingly, from the steps 501 and 502, 0+R(1)*a(1,1) is initially substituted to Σ(i). The search expression dividing unit 32 then checks whether or not the calculated result of the above formula Σ(i) exceeds the standard division threshold (step 504). If Σ(i) does not exceed the standard division threshold, then the search expression dividing unit 32 proceeds to the next table (i=i+1) and repeats the calculation performed at step 503 (steps 503 to 506). If the above processing has been performed for all the tables (that is, if i=M) (YES at step 505), then the the search expression dividing unit 32 proceeds to the next base range (j=j+1) and repeats the calculation performed at step 503 (steps 503 to 508).

If the Σ(i) exceeds the standard division threshold at step 504, then the search expression dividing unit 32 determines the first key in the base range next to the base range being processed as a search separator, and the the search expression dividing unit 32 returns to step 502 to repeat the same processing (step 509). If the above processing has been repeated for all the base ranges (that is, if j=N) (YES at step 507), then all the search separators for separating the original single search expression have been obtained. The search expression dividing unit 32 then creates search expressions obtained (hereinafter referred to as divided search expressions) by separating the original single search expression with the obtained search separators (step 510). Specifically, the search expression dividing unit 32 determines ranges between a particular search separator and the next search separator as separated ranges and creates divided search expressions to cover the separated ranges as search ranges. For example, if the search separators are key_1, key_2, key_3, . . . key_n, then section (key_1, key_2), section (key_2, key_3) . . . are separate ranges, and a between condition for each of the separate ranges for the key of the base table is added to the "where" phrase in the original single search expression (SQL sentence). As a result, the search expression dividing unit 32 divides the original single search expression into n divided search expressions (SQL sentences) for which ranges are specified based on the standard division threshold. The search expression dividing unit 32 stores the divided search expressions in storage such as the main memory 103 and the magnetic disk drive 105 in the computer in FIG. 2.

FIG. 6 shows an example of a input, single search expression (SQL sentence) and resultant divided search expressions. By causing the distributed database system 20 to execute a search processing under the execution control of the execution control unit 33, using the divided search expressions, the search result would be similar to that obtained by a search process using the input, single search expression. Because the standard division threshold has been determined based on the throughput of the integrated search system as described above, the result of a database search with each divided search expression can be obtained in a response time equal to or less than a particular response time predetermined by the integrated search system. The data distribution table 35 is created in advance at suitable timing in a process different from the database search. Consequently, the data distribution table 35 may not precisely reflect the status of the records stored in the databases 11 of the database servers 10 at the time the actual search is performed. Also, when data is updated in the databases 11, there is some delay before the update is reflected on the data distribution table 35. Nevertheless, typically, the information in the data distribution table 35 is accurate enough for the purposes of the present invention.

The execution control unit 33 reads from storage the divided search expressions created by the search expression dividing unit 32 and sequentially sends them to the distributed database system 20 to cause database searches to be executed. Processing with individual divided search expression is performed independently, so it is possible to insert interrupt processing between search processing. For example, it is possible to suspend a search process or resume the search process with a changed search condition when one or more divided search expressions have been executed. It is also possible to cause a search process by each divided search expression to be separately and automatically executed as a batch process. Accordingly, if it is predicted that a long time is required to complete all the searches when search processes with some divided search expressions have been executed, it is possible to suspend these search process and control the search processings with the remaining divided search expressions to be executed as a batch process.

The execution control unit 33 can also output information indicating the progress status of the search process using the divided search expressions on a display device to notify the user thereof. FIG. 7 shows an example of such notification of the progress status of the search processing (progress notification). The execution control unit 33 displays the number of data (records) corresponding to the search expression (the number of retrieved data), the number of data among the data held by the databases 11 to be searched, for which search has been performed (the number of finished data) and the total number of data to be searched (the total number) as numerical values. In the example of FIG. 7, the total number of data records to be searched is ten thousands at the start of the search. There is a display at "intermediate progress 1" of the search results at a point when searches with some divided search expressions have finished. Here, it is shown that the number of searched or "finished" data is one thousand and the number of retrieved/hit data is ten. There is another display at the "intermediate progress 2" of the search results at a point when searches with some additional divided search expressions have finished. Here, it is shown that the number of finished data is five thousands and the total number of retrieved/hit data is thirty four. There is another display a "search end" of the results of searches with all the divided search expressions. Here, it is shown that the number of finished data is ten thousands, which is identical to the total number, and the total number of retrieved hit data is seventy six. The final total number (the number for which search has been finished) and the number of retrieeed/hit data should be identical to those obtained when search is performed with the original single search expression.

FIG. 8 shows an example of a more graphic visual display of the progress status of the foregoing search process. In the bar graphs, the solid bars represent the extent to which the search has been finished and the areas marked with diagonal lines represent the total amount of data yet to be searched. The number of retrieved/hit data at each point of time is numerically displayed as in FIG. 7. By referring to the display of either FIG. 7 or FIG. 8, the user can learn the progress status of the search processing. This enables the user to predict the time required until the search is finished based on the time required for the search from the beginning to a particular point of time (the point of the intermediate progress 1, for example), estimate the final number of hit data, or determine whether to suspend the search process, change the search condition or switch to a batch process. An operator can set the timing for displaying the intermediate progress. For example, the intermediate progress can be set to be displayed each time a search with a predetermined number of divided search expressions (for example, one search expression) ends or each time the rate of the number of finished data relative to the total number reaches a predetermined value.

The execution control unit 33 assumes, when a search with the first divided search expression has been finished, the time required for the search and the number of data which have been searched to be the response time and the number of retrieved data (the number of records) to be obtained by executing a search with one divided search expression. Then, by multiplying the values by the number of the divided search expressions created from the original single search expression, the execution control unit 33 calculates the response time (estimated response time) and the number of retrieved data (estimated number of records) to be obtained by the search with all the divided search expressions (equivalent to the search to be performed by the original single search expression).

Similarly, each time a search by the n-th (n: $1 \leq n \leq N$) divided search expression is finished, the execution control unit 33 multiplies the time required for and the number of data retrieved by the search performed until then by N/n to calculate an estimated response time and an estimated number of records, and the immediately calculated estimated response time and estimated number of records are corrected as required. The estimated response time and the estimated number of records which have been calculated in this way can be presented to the user together with the display as shown in FIG. 7 or FIG. 8 to enable the user to determine whether to suspend the search processing, change the search condition or switch to a batch processing. Furthermore, an operator can set thresholds for the response time and the number of data retrieved by the search with all the divided search expressions in advance. In such a case, the execution control unit 33 compares the estimated response time and the estimated number of records which are calculated each time a search by each divided search expression is performed with the thresholds to prompt the user to review the search condition or switch to a batch processing (by displaying a message, for example) or automatically switch to a batch processing when either the estimated response time or the estimated number of records exceeds the threshold or both of them exceed the thresholds (that is, in the case where it is predicted that much time is required for the search or in the case where it is predicted that further refinement is required because of a large number of data (records) to be acquired).

As described above, the execution control unit 33 sequentially sends divided search expressions created by the search expression dividing unit 32 to the distributed database system 20 to cause refined searches to be sequentially executed. Therefore, an interrupt to suspend the search or switch to a batch processing can be performed between searches with the divided search expressions as needed. For example, if an event of switching to a batch processing is caused by a command input operation by the user, the execution control unit 33 detects the event and suspends the search when the search processing being performed with a divided search expression currently executed is finished. The search processings with the remaining divided search expressions are re-scheduled as a batch process. This enables the search processes with the remaining divided search expressions, which have been scheduled as a batch processing, to be automatically executed in accordance with the schedule.

As described above, by dividing a search expression prior to execution of a database search, and executing a refined search for each of particular search ranges using each of the divided search expressions, the execution of a search processing is controllable, such as checking the progress status, predicting the time required for the search, permitting a different processing to interrupt, and the like.

The search result outputting unit 34 combines the results of database searches executed by the distributed database system 20 under the control of the execution control unit 33 and outputs the search results on an output device such as a display device. As for the output format, in addition to a format in which the search results are collectively enumerated, it is also possible, in the case where the data to be searched have a data structure classified according to predetermined classification codes, to output the search results in a tabular format with the classification codes as display items. An example of a classification code is an experiment named "experiment result". In the case where the data is classified according to classification codes, if the classification according to the classification codes is visually represented in the search results, it may make it easier for the user who requested the search to refer to the data. Accordingly, a cross table in which distribution of the search results can be seen for the two items of "key" and "classification code" or a hierarchical table in which the search results are hierarchically displayed by sorting according to keys and sorting according to classification codes are created to output the search results.

FIGS. 9(A), 9(B) and 9(C) show an example of a search results data table, a cross table and a hierarchical table, respectively, from searches resulting from the divided search expressions. The cross table of FIG. 9(B) and the hierarchical table of FIG. 9(C) are generated from the search results data table of FIG. 9(A). In the cross table of FIG. 9(B), the data of FIG. 9(A) is sorted according to keys and classification codes. In the hierarchical table of FIG. 9(C), the classification codes and corresponding keys of the data of FIG. 9(A) are hierarchically represented. The key data entries correspond to main data. When outputting data in an output format with classification codes as display items, such as a cross table and a hierarchical table, all the data obtained as search results must be arranged based on the classification codes. In this process, data with classification codes which need not be outputted (which are not involved in display) are removed.

In this embodiment of the present invention, by performing the division of a search expression using a data distribution table described above in consideration of classification codes for data, the search performance can be enhanced. Specifically, the search expression dividing unit 32 first creates a data distribution table for classification codes for classifying data to be searched according to the data structure of the data, from a data distribution table 35 for key distribution as shown in FIG. 4. The data distribution table for classification codes is a distribution table showing how records of the tables of the databases 11 to be referenced by the distributed database system 20, corresponding to keys having a classification code, are distributed in base ranges for each classification code.

FIG. 10 shows the basic structure of a data distribution table for classification codes based on "item name" called for example, "item 1", "item 2" "item 3", "item 4" and "item 5". For data records with a key included in the range one, in the illustrated example there are forty such records for "item 1" and zero such records for each of "item 2" and "item 3". The data distribution table 35a is created as follows. A data distribution table 35 as shown in FIG. 4 is created first. As explained in the description of the data distribution table 35, the table to be a core for the search is assumed to be a base table, and the tables to be combined with the base table are assumed to be link tables. The classification code column is assumed to be in the link tables. Then, similar to the case of the data distribution table 35, while separating the range into base ranges such that the number of records included in each base range is approximately constant, the number of the records corresponding to the key included in each base range is calculated and recorded in association with the base range. It is not necessary to record a throughput correction value to the data distribution table 35a because the throughput correction value recorded to the data distribution table 35 for key distribution is used. In this way, the data distribution table 35a in which distribution of key data is recorded according to classification code. The data distribution table 35a is created for each link table of the data distribution table 35 for key distribution. Division of a search expression utilizing the data distribution table 35a for classification codes is performed according the procedures described below.

First, for a table which does not include classification codes, an optimization logic function prepares corrected data distribution tables with values multiplied by a throughput correction value. Meanwhile, for tables which include classification codes, in the data distribution table 35a corresponding to the table of concern (link table), the optimization logic function creates tables with values obtained by, in each base range, summing the number of data and multiplying the value with the throughput correction value of the table (the throughput correction value used for the data distribution table 35 is used). Then, the optimization logic function replaces the created table for the portion of the data distribution table 35 which corresponds to the created table. The operation of multiplying the number of data in each base range in the data distribution table 35a may be performed only for classification codes targeted to be outputted. After determining a standard division threshold, the single search expression inputted by the input accepting unit 31 is divided according to the procedure shown in FIG. 5.

FIG. 11 shows an example of a SQL search expression used for searching tables having classification codes and divided search expressions obtained by dividing the search expression. By causing the distributed database system 20 to execute a search processing with the use of the divided search expressions as shown in FIG. 11, which have been divided in consideration of classification codes, search results are obtained in a form arranged based on classification codes from the beginning. This is without scanning all the search results to arrange them based on the classification codes. The search results can be directly used to create a cross table or a hierarchical table by the search result outputting unit 34. Furthermore, when replacing a part of the data distribution table 35 for key distribution with the data distribution table 35a for classification codes, the data distribution table 35a only for classification codes targeted to be outputted are used as described above. Thereby data with classification codes that need not be output (which are not involved in display) are not targeted to be output from the beginning, which enables enhancement of search efficiency. Security information for data can be added to the data distribution table used in this embodiment. In some cases, it may be controlled whether or not particular data should be displayed by a particular application for the purpose of data protection. Access control of this kind is generally implemented by giving flag data to a table or a record stored in the databases 11. If fields for recording security information (security field) are added to the data distribution table 35 and the data distribution table 35a, as shown in FIG. 12, and access control is performed based on the information recorded in the security fields, then it is possible to control whether or not data should be displayed for each classification code. For example, in the example of FIG. 12, the security level of the "item 1" and "item 3" classification codes is specified by the value "1" in the security fields, and the security level of the "item 2" and "item 4" classification codes is specified by the value "2" in the security fields.

FIG. 13 is a flowchart showing the flow of the data search process by the integrated search system of this embodiment. The input accepting unit 31 of the search control system 30 inputs a search expression (SQL sentence) step 1301). Then, the search expression dividing unit 32 divides the search expression with the use of the data distribution table 35 and the data distribution table 35a to generate divided search expressions (step 1302). Then, the execution control unit 33 sends the divided search expressions sequentially to the distributed database system 20, and the distributed database system 20 performs an integrated search with the divided search expressions (step 1303). In this case, the search by each divided search expression is independently executed in the distributed database system 20. The result of each search is returned to the search control system 30.

It is determined whether or not the search by the last divided search expression has been performed by the execution control unit 33 (step 1304). If there is left any unprocessed divided search expression, the time required for and the prediction of search results of the entire search are updated based on the searches with divided search expressions which have already been finished and notified together with the progress status (step 1305). It is then determined whether or not any interrupt command such as suspension of the search has been inputted during the search (step 1306). If there is any interrupt command, the interrupt command is sent to the distributed database system 20 from the execution control unit 33 before the next divided search expression. An interrupt processing is then performed by the distributed database system 20 based on the interrupt command (step 1307). From the viewpoint of the distributed database system 20, this interrupt processing seems to be executed between searches using divided search expressions. However, from the viewpoint of the entire search by all the divided search expressions (equivalent to a search performed by the original single search expression), it appears that an interrupt processing such as suspension of the processing has been performed during the search. Because the processing can be suspended during the search, it is possible to perform flexible operations for the remaining searches (searches using unprocessed divided search expressions), such as changing the search condition and causing the searches to be automatically executed as a batch processing. If it is determined that the search with the last divided search expression has been performed at step 1304, then the search results with the divided search expressions are collectively outputted by the search result outputting unit (step 1308). If the searched data is classified according to predetermined classification codes, the search results may be outputted in a format, such as a cross table, in which the classification codes are treated as display items.

In the foregoing embodiment of the present invention, description has been made on a search control for providing a search expression (SQL sentence) for a distributed database system 20 for performing an integrated search for multiple database servers 10. However, this embodiment is applicable as means for performing processing of a search expression as a preprocessing prior to execution of a search for databases other than distributed databases.

The programs in systems 20 and 30 may be provided to these systems from magnetic disk, optical disk, semiconductor memory or other recording media and or by delivering it via network.

The invention claimed is:

1. A system for searching through multiple databases based on a search expression, said system comprising:
 a memory containing a set of instructions, the instructions including:
  defining instructions for defining a distribution of records corresponding to search keys in the multiple databases;
  dividing instructions for dividing the search expression into multiple search expressions based in part on the distribution of records, and determining respective target search ranges for the multiple search expressions such that each of a number of the distribution records to be searched with each of said multiple search expressions is approximately constant to others of the number of the distribution of records, wherein the dividing instructions use a data distribution table to divide the search expression, wherein the data distribution table indicates how the records are distributed in each table of a plurality of tables, wherein ones of the plurality of tables correspond to ones of the multiple databases, and wherein the records correspond to a common key;
  executing instructions for executing the multiple search expressions in respective target search ranges of the multiple search expressions; and
 a processing unit for executing the set of instructions.

2. The system according to claim 1, wherein the executing instructions sequentially acquire individual results of searches using the multiple search expressions and wherein the executing instructions display progress status.

3. The system according to claim 1, wherein before the executing instructions finishes executing all of the multiple search expressions for all of the target search ranges, the executing instructions predicts a first time required to complete all of the multiple search expressions for all of the target search ranges based on a second time already expended to execute the multiple search expression for a portion of the target search ranges and a relative amount of the target search ranges yet to be searched by the multiple search expressions.

4. The system according to claim 1, wherein the executing instructions includes instructions for receiving and processing an interrupt command between searches using the multiple search expressions.

5. The system according to claim 1, wherein the search keys are classified based on classification codes and the dividing instructions divides the search expression based in part on the classification codes.

6. The system of claim 1 further comprising:
 creating instructions for creating the data distribution table, wherein the creating instructions further comprise:
  instructions for designating a base table from the plurality of tables to be a core of an integrated search;
  instructions for dividing the base table into a number of base ranges for the common key such that the number of the distribution records in each range of the number of base ranges is approximately constant;
  instructions for, for each table other than the base table, calculating a second number of records corresponding to a base table key; and
  instructions for dividing each table other than the base table into corresponding ranges which correspond to the base ranges of the base table, wherein the corresponding ranges are based on an expected threshold amount of response time.

7. A system for searching through multiple databases based on a search expression, said system comprising:
 a memory containing a set of instructions, the instructions including:
  dividing instructions for dividing the search expression into multiple search expressions and determining respective search ranges for the multiple search expressions based in part on search rates through the respective search ranges, wherein the dividing instructions use a data distribution table to divide the search expression, wherein the data distribution table indicates how the records are distributed in each table of a plurality of tables, wherein ones of the plurality of tables correspond to ones of the multiple databases, and wherein the records correspond to a common key;

executing instructions for executing said multiple search expressions; and a processing unit for executing the set of instructions.

8. The system as set forth in claim 7 further comprising determining instructions for determining the respective search ranges such that each of the multiple search expressions is executed in a time less than or equal to a predetermined duration.

9. The system of claim 7 further comprising:
creating instructions for creating the data distribution table, wherein the creating instructions further comprise:
instructions for designating a base table from the plurality of tables to be a core of an integrated search;
instructions for dividing the base table into a number of base ranges for the common key such that the number of the distribution records in each range of the number of base ranges is approximately constant;
instructions for, for each table other than the base table, calculating a second number of records corresponding to a base table key; and
instructions for dividing each table other than the base table into corresponding ranges which correspond to the base ranges of the base table, wherein the corresponding ranges are based on an expected threshold amount of response time.

10. A computer implemented method for searching through multiple databases based on a search expression, said computer implemented method comprising:
dividing the search expression into multiple search expressions, wherein dividing is performed using a data distribution table, wherein the data distribution table indicates how the records are distributed in each table of a plurality of tables, wherein ones of the plurality of tables correspond to ones of the multiple databases, and wherein the records correspond to a common key;
determining respective search ranges for the multiple search expressions based in part on search rates through the respective search ranges;
executing the multiple search expressions to form a multiple search expression output; and
transmitting the multiple search expression output to a memory.

11. The computer implemented method as set forth in claim 10 wherein the determining step determines the respective search ranges such that each of the multiple search expressions is executed in a time less than or equal to a predetermined duration.

12. The computer implemented method as set forth in claim 10 wherein the search expression is SQL based, and the multiple search expressions are SQL based.

13. The computer implemented method of claim 10 further comprising:
creating the data distribution table by performing the steps of:
designating a base table from the plurality of tables to be a core of an integrated search;
dividing the base table into a number of base ranges for the common key such that the number of the distribution records in each range of the number of base ranges is approximately constant;
for each table other than the base table, calculating a second number of records corresponding to a base table key; and
dividing each table other than the base table into corresponding ranges which correspond to the base ranges of the base table, wherein the corresponding ranges are based on an expected threshold amount of response time.

14. A computer program product for searching through multiple databases based on a search expression, the computer program product comprising:
a computer readable medium;
first program instructions to divide the search expression into multiple search expressions, wherein the first program instructions use a data distribution table to divide the search expression, wherein the data distribution table indicates how the records are distributed in each table of a plurality of tables, wherein ones of the plurality of tables correspond to ones of the multiple databases, and wherein the records correspond to a common key;
second program instructions to determine respective search ranges for the multiple search expressions based in part on search rates through the respective search ranges;
third program instructions to execute the multiple search expressions to form a multiple search expression output; and
fourth program instructions to transmit the multiple search expression output to a memory, wherein the first, second, third, and fourth program instructions are recorded on the computer readable medium.

15. The computer program product as set forth in claim 14 wherein the second program instructions determine the search ranges such that each of the multiple search expressions is executed in a time less than or equal to a predetermined duration.

16. The computer program product of claim 14 further comprising:
fifth program instructions for creating the data distribution table, wherein the fifth program instructions comprise:
instructions for designating a base table from the plurality of tables to be a core of an integrated search;
instructions for dividing the base table into a number of base ranges for the common key such that the number of the distribution records in each range of the number of base ranges is approximately constant;
instructions for, for each table other than the base table, calculating a second number of records corresponding to a base table key; and
instructions for dividing each table other than the base table into corresponding ranges which correspond to the base ranges of the base table, wherein the corresponding ranges are based on an expected threshold amount of response time.

* * * * *